United States Patent
Mestad

[15] 3,672,133
[45] June 27, 1972

[54] CONVEYOR ATTACHMENT FOR A COMBINE

[72] Inventor: Herbert K. Mestad, R.R. 1, Clear Lake, Iowa 50428

[22] Filed: Oct. 14, 1970

[21] Appl. No.: 80,606

[52] U.S. Cl. .......................................... 56/13.5, 56/2, 198/7
[51] Int. Cl. ................................................ A01d 61/04
[58] Field of Search ................................. 56/2–5, 10.8, 13.3, 56/13.5, 14.3, 14.5, 14.6, 15.1, 16.4, 16.5, 16.6, 51, 94, 95, 119; 198/7; 130/6

[56] References Cited

UNITED STATES PATENTS

| | | | |
|---|---|---|---|
| 2,351,807 | 6/1944 | Court | 56/13.3 |
| 3,508,387 | 4/1970 | Wright | 56/95 |
| 2,571,865 | 10/1951 | Greedy et al. | 56/95 |
| 2,658,319 | 11/1953 | Hansen | 56/2 |
| 2,763,115 | 9/1956 | Skromme | 56/13.5 |

Primary Examiner—Antonio F. Guida
Attorney—Morton S. Adler

[57] ABSTRACT

An easily mountable and demountable auxiliary conveyor attachment for use with a combine whereby the combine can be driven or towed depending upon whether it is self-propelled to any location where grain is stored and such stored grain can be delivered by the auxiliary conveyor to the threshing mechanism of the combine. The use of the auxiliary conveyor makes the normal operating mechanism of the combine available particularly for shelling corn when such corn is located in a storage bin or other location remote from the growing crops where the combine is normally used. The conveyor is usable with either the corn head or grain head attached to the combine or may be used with the combine when neither the grain head or corn head is attached thereto. The conveyor is provided with a quick coupling attachment for operation to power sources available on the combine and may also be provided with a self-contained source of power.

13 Claims, 12 Drawing Figures

PATENTED JUN 27 1972

INVENTOR.
HERBERT K. MESTAD

BY *Morton S. Adler*

ATTORNEY.

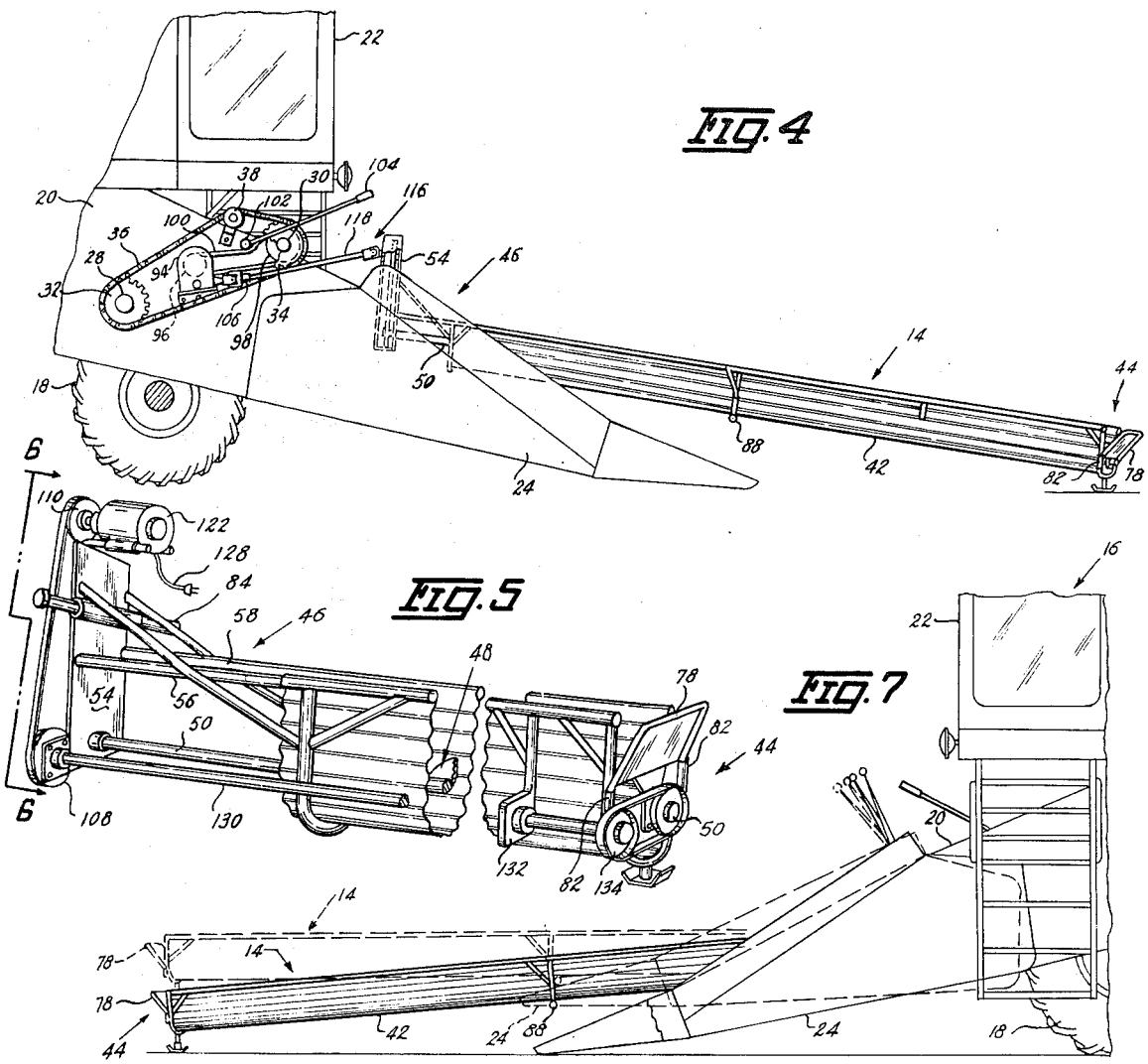
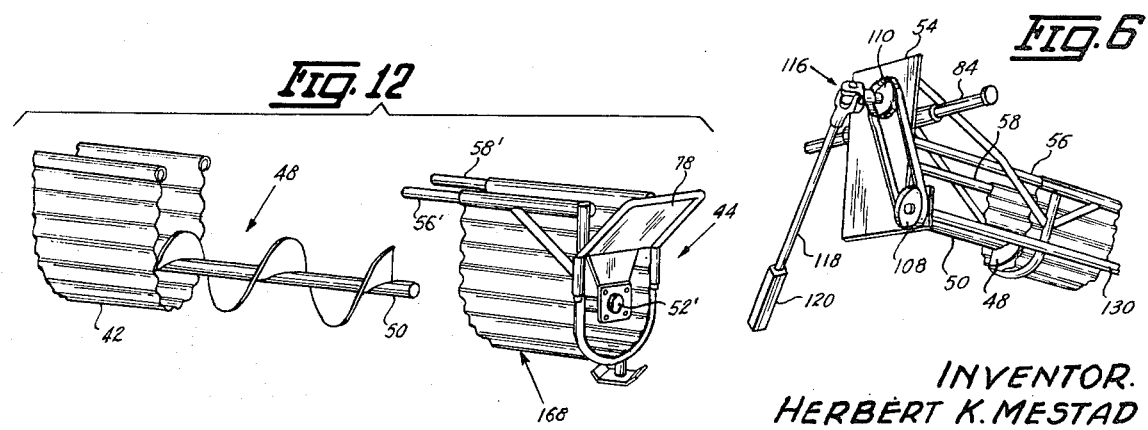

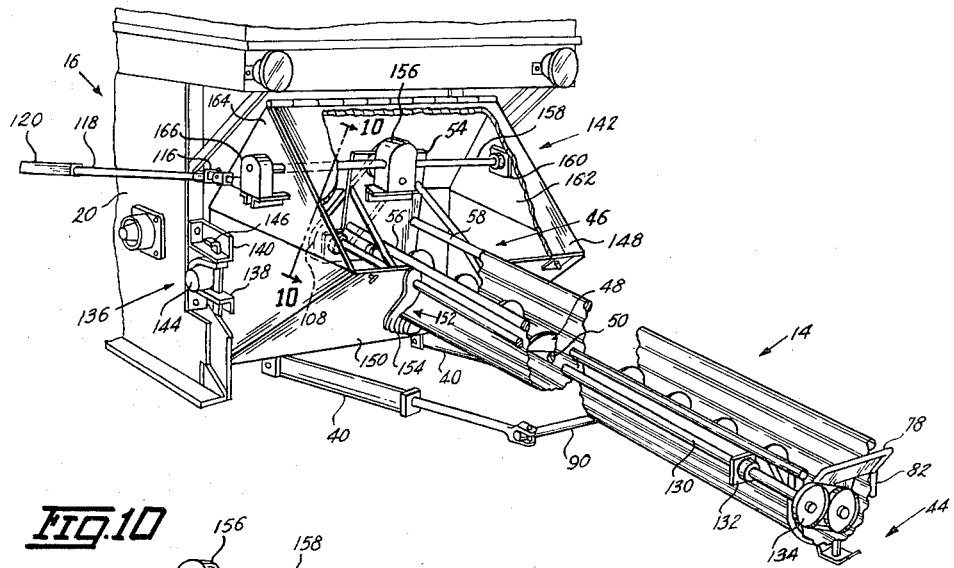
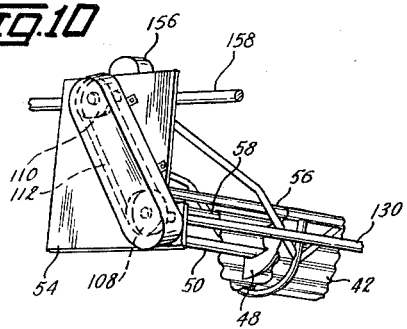
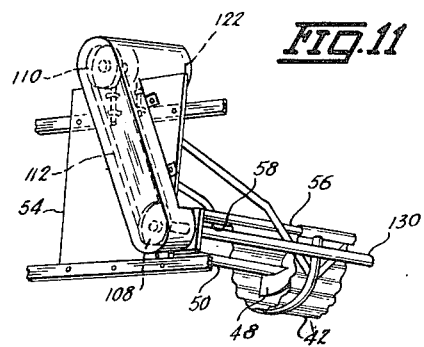
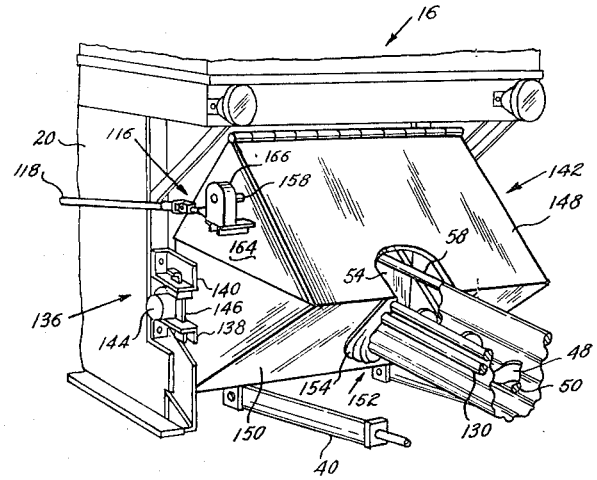
INVENTOR.
HERBERT K. MESTAD

CONVEYOR ATTACHMENT FOR A COMBINE

BACKGROUND OF THE INVENTION

This invention relates to improvements in combines and more particularly to the providing of an auxiliary conveyor attachment for a combine whereby the corn shelling capability of the combine can be utilized at any point where harvested corn is deposited or stored.

In the operation of a farm and particularly in regard to corn crops, it is not uncommon that substantial amounts of corn are harvested in the unshelled state for storage in bins or for deposit at some desirable location and this is true even though the combine machine is used at times to harvest and shell the corn in the field. The storage of unshelled corn may be due to the lack of availability of a combine or it may be desired to store the corn unshelled for a variety of reasons. When it becomes desirable to shell the stored corn, it is necessary to provide appropriate shelling machinery at the point of storage or otherwise to have the corn transported to the location of such machinery. The actual effect and operation of auxiliary corn shelling machinery is a duplication of the corn shelling capability available on a combine and the present invention proposes to eliminate the need for such duplication and to utilize the facility of the combine by driving it, or having it towed depending upon whether it is self-propelled, to a point adjacent the stored corn and transferring such stored corn to the operating mechanism of the combine.

The combine in its normal use and function is intended to be driven or towed through the growing crops and in its normal construction is incapable of being used to shell corn already harvested and accumulated at a storage point.

In the present invention, one of the important objects is to provide an auxiliary conveyor apparatus, preferably in the form of an auger, which can be quickly and easily mounted to and detached from the combine so that one end of the conveyor can be oriented relative to a supply of stored corn and deliver it to the operating mechanism of the combine.

A further object of this invention is to provide a conveyor attachment of the above class which requires no tools for mounting or demounting relative to the combine and which is provided with a suitable power hookup system for obtaining operating power from the combine.

Still another object of this invention is to provide a conveyor arrangement with the combine as described in which the conveyor is provided with a self-contained source of power, if desired.

Another object herein is to provide an auxiliary conveyor attachment for a combine of the above class which in one embodiment can be efficiently used when the corn head or grain head or other attachments are associated with the combine and in a second embodiment can be associated directly with the combine without the presence of any of such attachments.

SUMMARY

The present invention provides for the use of an elongated conveyor apparatus preferably in the form of an auger but which may be a belt or the like that can be quickly and easily arranged relative to a combine so that one end is oriented relative to the threshing cylinder and the other end can be disposed in a storage bin or any other place where there is a large amount of stored corn. This conveyor is designed to be used on a combine with and without the presence of combine attachments such as a corn head and when the corn head is attached, one end of the conveyor is pivotally attached thereto. A suitable gear box is mounted at any convenient place on the combine frame and is connected by a belt drive to a pulley attached to one of the operating shafts. Means are provided to connect the auxiliary conveyor to the gear box and such connection may be either at that end of the conveyor mounted on the combine or at the opposite end of the conveyor which is oriented relative to the point of corn pickup.

When there is no normal attachment component on the combine such as having the corn head removed, this invention utilizes a receiving hopper that can be detachably mounted to the combine at the same points of attachment for the corn head and in this arrangement, one end of the auxiliary conveyor will be suitably mounted to the hopper for delivering corn thereto.

The combine in its normal construction includes hydraulic jack means for raising and lowering attachments such as the corn head and when this conveyor is used with a corn head, means are provided that the elevation and lowering of the corn head will correspondingly elevate and lower the conveyor. When the conveyor is used on the combine with the corn head removed, such conveyor is directly connected to the hydraulic jack means for such purposes.

An idler means which is lever operated is associated with the pulley on the gear box so that the operator can at his discretion place the conveyor into or out of operation while the combine machinery is running. The extended end of the conveyor is provided with a suitable wing board as a guide for properly orienting the conveyor with the storage bin.

The objects of this invention together with details of the operation outlined and the advantages of the same will be more fully described and developed in relation to the more detailed description of the accompanying drawings.

BRIEF DESCRIPTION OF THE DRAWINGS

FIG. 4 is a side elevation view of this conveyor shown in relation to the forward portion of a combine, FIG. 5 is an enlarged perspective view of this conveyor showing a modified form of driving the conveyor shaft, FIG. 6 is a perspective view taken from the line 6—6 of FIG. 5 to more clearly illustrate the driving assembly therein for the conveyor shaft, FIG. 7 is a side view showing the conveyor in solid lines in operating position and resting on the ground and in broken lines showing its elevated position to which it can be moved by the combine, FIG. 8 is a perspective view showing this conveyor arranged relative to a hopper associated with the forward end of a combine on which the corn head has been removed and with the hopper partially cut away, FIG. 9 s is a perspective view similar to FIG. 8 to show the hopper cover in closed position, FIG. 10 is a perspective view of the driving mechanism associated with the conveyor shaft and with a power supply on the combine taken from the line 10—10 of FIG. 8, FIG. 11 is a view similar to FIG. 8 but showing a self-contained source of power, and FIG. 12 is a perspective view of the outer end portion of the conveyor to illustrate a modified arrangement for removing the end portion thereof.

DESCRIPTION OF THE PREFERRED EMBODIMENTS

Figure 1:
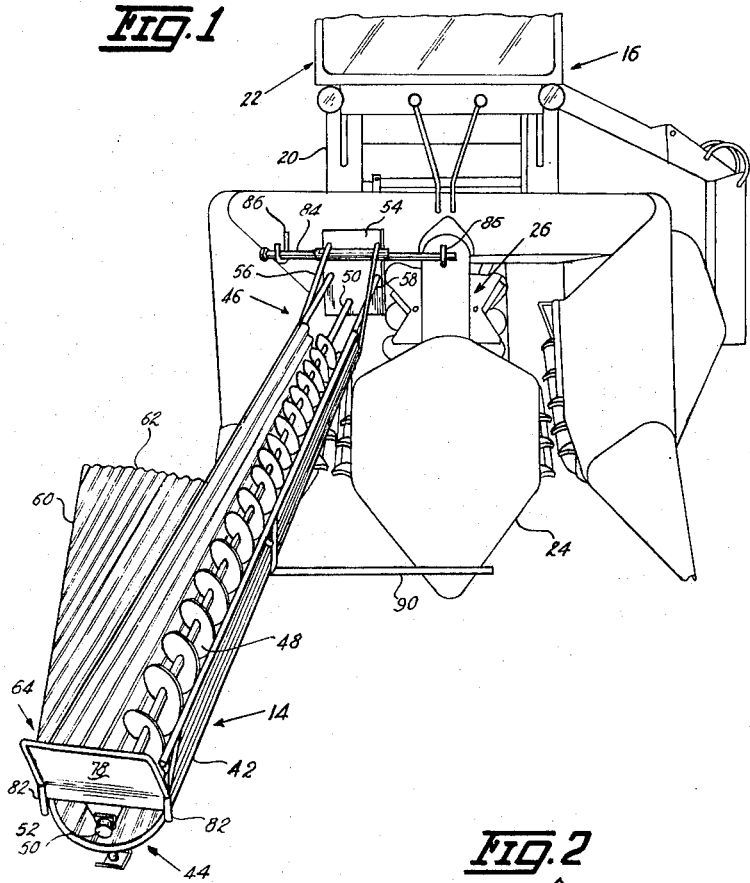
FIG. 1 is a front view of a combine with the corn head attached and showing my new conveyor attachment in operating position.

Referring to the drawings, this invention relates to a conveyor assembly designated generally by the numeral 14 for removable attachment to and use with a combine harvester of which only the forward portion as relates to this invention is shown in the drawings and is designated generally by the numeral 16. The combine 16 is a well known machine for which no invention is claimed herein and may be either self-propelled or of a type that must be towed. In general, such machine includes crop-gathering apparatus whereby the crops are delivered into a threshing cylinder assembly and ultimately moved through various other features of the combine until it is discharged from the rear end. The combine by means of its threshing cylinder arrangement is capable of shelling gathered corn as the machine moves through the field and the principal object of the present invention is to utilize this normal capability for shelling corn under circumstances where the corn has previously been harvested and stored in an unshelled state and in an environment in which a combine is not normally designed to function. Thus, for purposes of the present invention, only sufficient portions of the combine have been shown and will be identified generally so that the use of the conveyor 14 as it will be described can be fully appreciated.

Only the forward end of the combine 16 is particularly involved in relation to conveyor 14 and for this purpose there is shown the relative position of the drive wheels 18, the forward housing portion 20 and the operator's compartment or cab 22. To the forward end of the combine there is available certain attachments illustrated here in the form of the corn head 24 of a well known type and design that is generally referred to as the crop-gathering mechanism. As best seen in FIG. 1, the corn head 24 is in direct alignment with mechanism 26 that operates in a well known manner to shell corn delivered thereto by the corn head as the combine moves through the field. The operation of mechanism 26 is not a part of this invention but is a well known apparatus found in combine harvesters and, as indicated above, it is the intention of the present invention to use the corn shelling capabilities of mechanism 26 on a combine machine. It will be understood that combine 16 includes several power driven shafts to operate its several components and as best seen in FIG. 4, I have illustrated a pair of shafts 28 and 30 which carry the respective sprockets 32 and 34 that are connected in a well known manner by the endless chain 36 trained also over a suitable idler wheel 38. It will be understood that combine 16 includes power sources for driving chain 36 and in one embodiment of this invention as will appear, I have utilized this source of power. There are, of course, several different driven shafts on a combine harvester which may be utilized and shafts 32 and 34 are merely illustrative of the availability of such power sources on the combine machine.

The forward end of the combine 16 includes a hydraulic jack means 40 as seen in FIG. 8 and when an attachment such as corn head 24 is used, it is pointed out that such head is pivotally attached to the forward end of the combine so as to be vertically elevatable relative thereto in a well known manner in which case the jack means 40 is appropriately attached to the underside of the corn head. This is a standard feature for the combine for which details of the construction are not deemed necessary for purposes of this invention.

The purpose of conveyor 14 is to deliver corn from a point of storage remote from the growing crops directly into the corn shelling mechanism 26 of the combine 16. Normally such combine is designed to function only as it moves through growing crops which are gathered in by apparatus 24 and delivered to apparatus 26 but with the present invention as will appear, combine 16 can be driven or towed to the vicinity of stored corn where its self-contained mechanism 26 can be fully utilized to shell corn delivered thereto by conveyor 14. In one embodiment as seen in FIG. 1, conveyor 14 will be described in relation to a combine having the crop gathering attachment 24 mounted thereon and in a second embodiment shown in FIG. 8, the operation of conveyor 14 will be described relative to a combine on which the crop gathering attachment has been removed.

Conveyor 14 includes an elongated U-shaped trough 42 for which I have used corrugated sheet metal but which may be made of any suitable material. For purposes of description, conveyor 14 includes a pickup or receiving end 44 and a delivery end 46. Disposed longitudinally within trough 42 is a conveyor means here shown in the form of an auger or screw assembly 48 having the shaft 50. At the pickup end 44, shaft 50 is journalled in a suitable support 52 and at the delivery end, shaft 50 extends through a vertically disposed mounting plate 54. Rods 56 and 58 may be attached in any suitable manner and since I have used sheet metal for trough 42, I have rolled the edges of the trough back upon themselves to provide appropriate channels into which rods 56 and 58 can be journalled.

Figure 2:
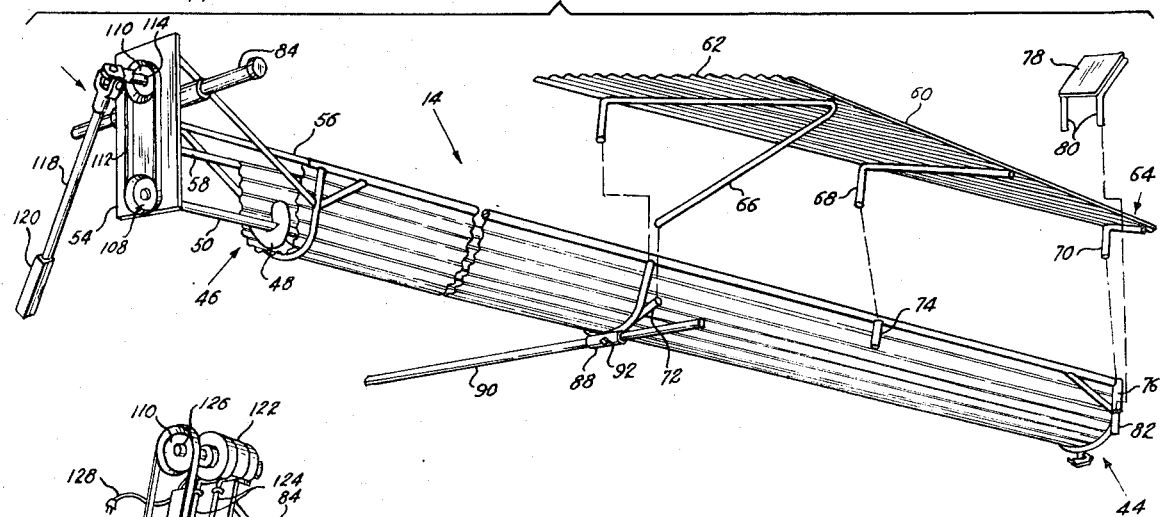
FIG. 2 is an enlarged perspective exploded view of this new conveyor attachment showing at the left end as viewed a shaft extension for connection to a source of power on the combine.

A wing board 60 provided for use with trough 42 is generally triangular in shape having a wide end 62 oriented toward trough end 46 and with converging sides to a narrow end 64 at trough end 44. Wing board 60 is detachably arranged relative to trough 42 by means of a plurality of spaced rod braces 66, 68 and 70 for slip-fit connections with respective spaced pipe supports 72, 74 and 76 on trough 42 as best seen in FIG. 2. A deflector plate 78 for the receiving end 44 of conveyor 14 includes a pair of spaced rods for a slip-fit connection with a pair of spaced pipe supports 82 on trough 42 as seen in FIG. 1 and 2. Plate 78, as will appear, serves to deflect corn at the receiving end onto the conveyor apparatus 48 and away from the corresponding end of shaft 50. The purpose of wing board 60 is to serve as a guide and a bumper means against the side of a storage building or the like in the movement of combine 16 for maneuvering conveyor 14 into place.

On the forward face of mounting plate 54 is secured a transverse support rod 84 that projects laterally from each side of plate 54 and is adapted to rest or hang in a pair of spaced U brackets 86 mounted on the housing of the corn head 24 as seen in FIG. 1. This point of mounting for rod 84 will orient the delivery end 46 of conveyor 14 at a point where material moving through the conveyor will be discharged into the corn shelling mechanism 26. To the underside of trough 14 there is provided a collar 88 as seen in FIG. 2 for slidably receiving a horizontally extending rod 90 that may be adjusted as to position relative to collar 88 by a set screw 92. Rod 90, as best seen in FIG. 1, is adjusted to overlap a portion of the leading end of the corn head 24 so that at times when such corn head is elevated as by the jack 70 in a well known manner, rod 90 will be contacted to correspondingly elevate conveyor 14 which it will be appreciated is pivotally arranged by means of rod 84 resting in brackets 86. Such elevation permits this conveyor 14 to be transported by the combine when desired.

The operation of the auger shaft 50 may be from power already present on the combine or independently thereof and I have illustrated both forms of doing this as follows.

For utilizing a source of power available on the combine, reference is made particularly to FIGS. 2 and 4. As seen in FIG. 4, I have mounted a suitable gear box 94 having the pulley 96 to the frame of the combine. A second pulley wheel 98 is mounted to shaft 30 which it will be understood is driven by power sources on the combine and pulleys 96 and 98 are connected by a belt 100 for supplying power to box 94. An idler wheel 102 is provided in relation to belt 100 and is operable by a lever 104 whereby belt 100 can be engaged or disengaged. Also as a part of gear box 94, there is provided an elongated square chambered socket 106 adapted to rotate about a longitudinal axis. Thus far described, it will be appreciated that power from shaft 30 is transferred through the gear box 94 to the socket 106. With reference now to FIG. 2, at the rear side of the mounting plate 54, there is mounted a pulley wheel 108 attached to the end of shaft 50 and in spaced relationship above wheel 108 on the back side of plate 54 there is a second pulley 110 with said pulleys being connected by the endless belt 112. Pulley 110 is carried by a stub shaft 114 to which is connected a universal joint mounting 116. One end of a shaft 118 is attached to mounting 116 and the other end thereof has the portion 120 which is square in cross section and which is adapted to be slip-fitted into the socket 106. By this arrangement, shaft 50 can be operatively connected to the power source from the combine as the conveyor 14 is put into position as described.

Figure 3:
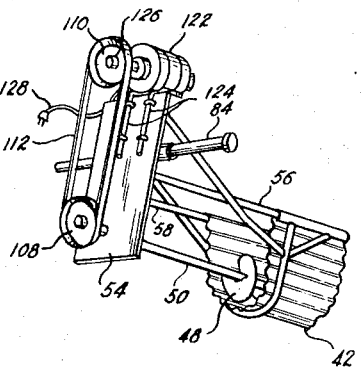
FIG. 3 is a perspective fragmentary section similar to the left end portion of FIG. 2 and showing a modification for a self-contained source of power for the conveyor shaft.

With reference to FIG. 3, I show means for driving shaft 50 independently of a power source from the combine and like parts of this drive assembly to those previously described will be given like numerals. In the independent power source, the universal joint 116 and shaft 118 are not required nor are the gear box 94 and the related parts described. The independent source of power is provided by an electric motor 122 suitably mounted as by rod brackets 124 to plate 54. Pulley 110 is mounted to the motor shaft 126 and belt 112 connects pulleys 108 and 110 as previously described. An electric cord 128 can be attached to any convenient source of electric power.

In the means for driving shaft 50 as just described, it is pointed out that the power for driving such shaft has been applied to the delivery end 46 of the conveyor 14 but I have also provided for driving drive shaft 50 from the receiving end 44 and this is illustrated in FIG. 5 where the electric motor 122 is used and in FIG. 6 where power is obtained from the combine. In these embodiments, a drive shaft 130 is mounted externally of trough 14 in parallel spaced relationship to shaft 50 so that one end of shaft 130 is journalled through plate 54 and supported intermediate its ends by an appropriate member 132. At the receiving end 44, shaft 130 carries a pulley 134 which is connected by a belt 136 to a pulley 138 mounted at the receiving end of shaft 50. On the rear side of plate 54 pulley 108 is secured to shaft 130 so that it will be apparent the power for driving shaft 50 is applied from the receiving end 44 with either of the power sources described.

With reference now to FIGS. 8-10, I have shown conveyor 14 associated with the combine 16 when any attachment such as the corn head 24 has been removed. As seen in FIG. 8, the forward edge of the combine housing 20 includes a mounting bracket arrangement designated generally by the numeral 136 of which there is one on each side of the front and this is the means as is well known by which attachments such as the corn head 24 are removably attached. Assembly 136 includes generally horizontally arranged and vertically spaced bracket members 138 and 140 into which suitable mounting lugs (not shown) on attachments such as corn head 24 can be placed and secured in a well known manner. With such attachments removed, I have utilized my conveyor 14 as described in relation to a hopper member 142 that is adapted to be removably mounted in the mounting unit 136. While both sides of the hopper are similarly arranged for such mounting, only one side is illustrated where it will be seen that a suitable stud or boss 144 projecting from the hopper side is designed to be positioned between brackets 138 and 140 and secured therein by a suitable pin 146 in substantially the same manner and form as used for the mounting of the usual combine attachments and thus hopper 142 is in effect a new attachment device not heretofore used with the combine harvester machine as it is generally known. Hopper 142 has a closable hinged cover 148 and has an open rear side (not shown) which is oriented relative to the corn shelling mechanism 26 when mounted as seen in FIGS. 8 and 9.

In the arrangement of conveyor 14 to hopper 142 as will appear, the substantial portion of the apparatus for driving the conveyor shaft 50 is the same as previously described and accordingly like numerals will be given for like parts. The forward slanted hopper-like side 150 of hopper 142 is provided with a generally U-shaped cut out notch 152 and trough 42 of the conveyor 14 is nested in notch 150 so that the delivery end 46 is disposed within the hopper 142 above the slanted side 150. At the point of nesting of trough 42 in notch 150, a flexible curtain or skirt 154 is suitably attached and secured to the outer perimeter of trough 42. Such skirt is extensible in an accordion-like fashion so as the conveyor 14 may be raised relative to hopper 142 as will be described, the space below the trough and hopper side 150 will be enclosed to prevent the passage of any corn out of the hopper at this point.

A gear box 156 is secured to the forward upper side of mounting plate 54 and carries a transversely arranged shaft 158 which at one end is rotatably journalled in a bearing 160 on hopper side 162 and at the other end extends through hopper side 164 into rotatable operable connection with gear box 166 mounted on the outer side of hopper side 164 as shown. Shaft member 118 with its square shank 120 as previously described is connected by the universal mounting 116 to gear box 166 so as to receive power from the combine machine as heretofore disclosed and it will be appreciated that power from the combine is transmitted to gear box 156. The back side of plate 54 relative to FIG. 8 is seen in FIG. 10 where pulley 110 is operatively connected to gear box 156 and pulley 108 is similarly arranged relative to shaft 130 with belt means 112 connecting pulleys 108 and 110 as previously described. In FIG. 11 there is shown the use of the electric motor 122 as the source of power for driving shaft 130 and in this arrangement, it will be understood that gear box 166 will not be required nor will shaft 118 and the other driving components previously described in relation to the combine.

The jacks 40 will be appropriately connected to rod 90 whereby conveyor 14 can be suitably elevated or lowered and in the elevation thereof it will be understood that the delivery end 46 will pivot on the attaching points of shaft 158 at the hopper sides.

While the driving power for shaft 50 in FIG. 8 where hopper 142 is used is shown for illustration as being applied to the receiving end 44, it will be understood as a part of this disclosure that such power in the use of hopper 142 can also be applied to the delivery end 46 of shaft 50 as previously described and illustrated in FIGS. 2 and 3.

With reference to FIG. 12, I show a slight modification of trough 42 where a short end portion at the receiving end 44 has been formed into a detachable section 168 and carries the rod extension 56' and 58' for slip-fit attachment to the upper rolled edges of trough 42. A bearing member 52' at the outer end of section 168 is provided for suitably supporting the end of shaft 50. With this arrangement, end 168 can be removed to permit the exposure of a portion of the conveyor mechanism 48 as shown which, in some circumstances is a convenient means of use.

It will be appreciated from the foregoing that conveyor 14 makes it possible to utilize the corn shelling capabilities of combine 16 under circumstances where such combine is not normally capable of being used. The combine can be driven or towed to any point where corn is stored and this may be accomplished with or without the conveyor 14 being attached. In any event, the attachment of conveyor 14 to the combine either with or without the presence of any attachment such as corn head 24 is a relatively simple matter that does not require the use of any tools. By the use of conveyor 14, the necessity for special auxiliary corn shelling machinery is completely eliminated together with the necessary expense and maintenance of such equipment. Thus, from all of the foregoing it is thought that a full and complete understanding of the construction and operation of this invention will be had and its advantages appreciated.

I claim:

1. In a combine harvesting machine having a crop receiving end, crop processing machinery including corn shelling apparatus disposed to receive and shell corn delivered to the crop receiving end, and self-contained power sources for operating said crop processing machinery, the combination therewith of:
    an elongated conveyor assembly having a crop pickup end and a crop delivery end,
    said crop pickup end adapted to be disposed in crop-gathering relationship relative to a stored supply of previously harvested crops,
    means detachably securing said delivery end to the crop receiving end of the combine harvester machine,
    a source of power for operating said conveyor assembly whereby the stored crops can be delivered by said conveyor assembly to said corn shelling apparatus,
    said conveyor assembly having a trough member,
    an auger type conveyor mounted in said trough so as to extend from said pickup end to said delivery end, and
    means for detaching a predetermined length of said trough member at said pickup end whereby a portion of said auger conveyor in the operation thereof extends outwardly from the shortened trough member.

2. Apparatus as defined in claim 1 where said source of power includes:

a power take-off means mounted on said combine and operatively connected to one of said power sources, means operatively connecting said conveyor assembly to said power take-off means, and control means associated with said last mentioned means to selectively render the same inoperable whereby the operation of the conveyor assembly can be shut down without shutting down the power supply from the combine.

3. Apparatus as defined in claim 1 including a motor member carried by said conveyor assembly and operatively connected thereto.

4. Apparatus as defined in claim 1 including:

said conveyor assembly having a trough member and an auger type conveyor mounted therein, a gear box mounted on said combine and operatively connected to one of said power sources, a support plate at the delivery end of said conveyor assembly, one end of said auger conveyor being journalled in said support plate, and adjustable drive connection means operatively connecting said auger conveyor at said delivery end to said gear box.

5. Apparatus as defined in claim 1 including:

said conveyor assembly having a trough member and an auger type conveyor mounted therein, a support plate at the delivery end of said conveyor assembly, one end of said auger conveyor being journalled in said support plate, a motor mounted on said support plate, and drive connection means operatively connecting said auger conveyor at said delivery end to said motor.

6. Apparatus as defined in claim 1 including:

said conveyor assembly having a trough member and an auger type conveyor mounted therein, a gear box mounted on said combine and operatively connected to one of said power sources, a support plate at the delivery end of said conveyor assembly, one end of said auger conveyor being journalled in said support plate, a shaft mounted to the exterior of said trough in parallel relationship to said auger conveyor and journalled at one end in said support plate, adjustable drive connection means operatively connecting said shaft at said delivery end to said gear box for rotation of said shaft about its longitudinal axis, and power transfer means at the other end of said shaft operatively connected to the pickup end of said auger conveyor.

7. Apparatus as defined in claim 1 including:

said conveyor assembly having a trough member and an auger type conveyor mounted therein, a support plate at the delivery end of said conveyor assembly, one end of said auger conveyor being journalled in said support plate, a shaft mounted to the exterior of said trough in parallel relationship to said auger conveyor and journalled at one end in said support plate, a motor mounted on said support plate, drive connection means operatively connecting said shaft at said delivery end to said motor, and power transfer means at the other end of said shaft operatively connected to the pickup end of said auger conveyor.

8. Apparatus as defined in claim 1 where said combine harvesting machine includes crop-gathering apparatus detachably secured to the crop receiving end and elevating means on the combine connected to the crop-gathering apparatus to elevate the same when moving the combine to and from its normal area of operation, the combination therewith of:

means on said conveyor assembly engageable with said crop-gathering apparatus whereby in the elevation of said crop-gathering apparatus, said conveyor assembly is correspondingly elevated and can be transported by the combine to different desired locations.

9. Apparatus as defined in claim 8 including a wing board detachably mounted to one side of said conveyor assembly to serve as a guide means in the movement of said conveyor assembly by the combine into crop pickup position relative to stored crops.

10. Apparatus as defined in claim 1 including:

a hopper having an inclined front wall, closed sides and an open back and top, means detachably mounting said hopper to the crop receiving end of the combine so that the open back is in juxtaposition to the corn shelling apparatus, and means on the delivery end of said conveyor assembly attachable to said hopper for supporting said delivery end over said front wall and intermediate said hopper sides.

11. Apparatus as defined in claim 10 wherein said combine harvesting machine includes elevating apparatus available for use with attachments associated with said crop receiving end, the combination therewith of:

a support plate on the delivery end of said conveyor assembly, a transverse rod on said support plate pivotally journalled at respective opposite sides in said respective hopper sides, and means connecting said conveyor assembly to said elevating apparatus whereby said pickup end can be elevated to permit said conveyor assembly to be transported by the combine to different desired locations.

12. In a combine harvesting machine having a crop receiving end, crop processing machinery including corn shelling apparatus disposed to receive and shell corn delivered to the crop receiving end, and elevating apparatus available for use with attachments associated with said crop receiving end, the combination therewith of:

an elongated conveyor assembly having a crop pickup end and a crop delivery end, said crop pickup end adapted to be disposed in crop-gathering relationship relative to a stored supply of previously harvested crops, means detachably securing said delivery end to the crop receiving end of the combine harvester machine, a source of power for operating said conveyor assembly whereby the stored crops can be delivered by said conveyor assembly to said corn shelling apparatus, a hopper having an inclined front wall, closed sides and an open back and top, means detachably mounting said hopper to the crop receiving end of the combine so that the open back is in juxtaposition to the corn shelling apparatus, said front wall having a U notch communicating with the upper wall edge, a support plate on the delivery end of said conveyor assembly, a transverse rod on said support plate pivotally journalled at respective opposite sides in said respective hopper sides so that a portion of said conveyor assembly rests in said notch with said delivery end disposed within said hopper, means connecting said conveyor assembly to said elevating apparatus whereby said pickup end can be elevated to permit said conveyor assembly to be transported by the combine to different desired locations, the elevation of said conveyor assembly causing it to move at least partially out of said notch, a flexible accordion-like skirt secured throughout the edge of said notch and to the abutting portion of said conveyor assembly, and a hinged cover over the top of said hopper.

13. Apparatus as defined in claim 12 including:

said conveyor assembly having a trough member, an auger type conveyor mounted in said trough so as to extend from said pickup end to said delivery end, and means for detaching a predetermined length of said trough member at said pickup end whereby a portion of said auger conveyor in the operation thereof extends outwardly from the shortened trough member.

* * * * *